(12) United States Patent
Cornelison et al.

(10) Patent No.: US 6,948,928 B2
(45) Date of Patent: Sep. 27, 2005

(54) CATALYTIC COMBUSTOR FOR A GAS TURBINE

(75) Inventors: Richard C. Cornelison, Boulder, CO (US); William B. Retallick, West Chester, PA (US); William A. Whittenberger, Leavittsburg, OH (US)

(73) Assignee: Catacel Corporation, Leavittsburg, OH (US)

( * ) Notice: Subject to any disclaimer, the term of this patent is extended or adjusted under 35 U.S.C. 154(b) by 601 days.

(21) Appl. No.: 10/036,099

(22) Filed: Oct. 18, 2001

(65) Prior Publication Data

US 2004/0185400 A1 Sep. 23, 2004

(51) Int. Cl.$^7$ .............................................. F23Q 11/06
(52) U.S. Cl. .......................... 431/268; 431/7; 502/439; 422/181; 60/723
(58) Field of Search ............................... 422/181, 439; 502/439; 431/7, 170, 268; 60/723

(56) References Cited

U.S. PATENT DOCUMENTS

| | | | | |
|---|---|---|---|---|
| 4,576,800 A | * | 3/1986 | Retallick | 422/180 |
| 4,673,553 A | * | 6/1987 | Retallick | 422/180 |
| 4,687,491 A | * | 8/1987 | Latty | 44/301 |
| 4,711,009 A | * | 12/1987 | Cornelison et al. | 29/890 |
| 4,765,047 A | * | 8/1988 | Retallick | 29/890 |
| 4,930,454 A | * | 6/1990 | Latty et al. | 122/4 D |
| 5,202,303 A | * | 4/1993 | Retallick et al. | 502/439 |
| 5,248,251 A | * | 9/1993 | Dalla Betta et al. | 431/7 |
| 5,250,489 A | * | 10/1993 | Dalla Betta et al. | 502/265 |
| 5,258,349 A | * | 11/1993 | Dalla Betta et al. | 502/330 |
| 5,328,359 A | * | 7/1994 | Retallick | 431/326 |
| 5,346,389 A | * | 9/1994 | Retallick et al. | 431/7 |
| 5,406,704 A | * | 4/1995 | Retallick | 29/890 |
| 5,437,099 A | * | 8/1995 | Retallick et al. | 29/890 |
| 5,512,250 A | * | 4/1996 | Betta et al. | 422/173 |
| 6,197,365 B1 | * | 3/2001 | Bachinger et al. | 427/115 |

FOREIGN PATENT DOCUMENTS

| | | | | |
|---|---|---|---|---|
| DE | 4018704 A1 | * | 1/1992 | B01J/32/00 |
| WO | WO 9209848 A1 | * | 6/1992 | F23D/14/00 |
| WO | WO 9955459 A1 | * | 11/1999 | B01J/37/02 |

* cited by examiner

Primary Examiner—Cheryl Tyler
Assistant Examiner—James G. Barrow
(74) Attorney, Agent, or Firm—William H. Eilberg

(57) ABSTRACT

A catalytic combustor for a gas turbine includes a stack of metal strips, each strip having an inlet end and an outlet end. The inlet ends of both sides of the strip are uncoated, to limit the temperature and maintain rigidity of the strip at the inlet end. In one embodiment, both sides of the strip have a light-off band, coated with catalyst, and adjacent to the uncoated inlet band. One side of the strip (Side A) also includes at least one combustion band, while the other side (Side B) has no corresponding coated band. The strips are arranged such that Side A of a given strip inside the stack faces Side A of an adjacent strip, and Side B of a strip inside the stack faces Side B of an adjacent strip. The resulting structure prevents overheating of the combustor, maintains its rigidity, and reduces the pressure drop through the combustor.

19 Claims, 6 Drawing Sheets

SIDE A

CATALYTIC COMBUSTOR FOR A GAS TURBINE

BACKGROUND OF THE INVENTION

This invention relates to a catalytic combustor for a gas turbine.

The purpose of the catalytic combustor of the present invention, as opposed to a simple flame combustor, is to reduce the formation of nitrogen oxides, or NOx. This object is explained in U.S. Pat. No. 5,202,303, the disclosure of which is incorporated herein by reference.

The catalytic combustor in the above-cited patent is a honeycomb comprised of metal strips which are coated with catalyst on just one side. The strips are stacked so that coated sides face each other and uncoated sides face each other. This stack of strips defines a structure in which catalyzed channels alternate with uncatalyzed channels. Only the portion of the fuel-air mixture which flows through the catalyzed channels is combusted within the honeycomb. Since the fuel-air mixture flowing through the uncatalyzed channels is not combusted, the honeycomb is cooled by that portion of the mixture, and the catalyst is not deactivated. Combustion is completed in a flame downstream of the honeycomb. With this configuration, the "window" of time and temperature that makes NOx is avoided.

The present invention provides a structure for a catalytic combustor, which structure reduces the pressure drop through the combustor, and also reduces the stress on the strips where the temperature is highest.

SUMMARY OF THE INVENTION

The present invention comprises a catalytic combustor formed of a plurality of similar strips arranged in a stack. Each strip has two sides, designated Side A and Side B, and each strip defines two ends, designated the inlet and outlet ends, according to the direction of intended gas flow.

In one embodiment, Side A of each strip has an inlet band, located at the inlet end, the inlet band being uncoated. The remainder of Side A is coated with a catalyst. In this embodiment, all of Side B is uncoated. Thus, in this embodiment, there is effectively an uncoated band at the inlet end of both sides of the strip. This uncoated band allows the structure to be welded, as it is not possible to weld through a catalyst coating. The uncoated band also serves to limit the temperature of the strip at the inlet end, and thereby maintains the rigidity of the strip at this end.

In another embodiment, Side B has a light-off band that is coated with catalyst, the light-off band being spaced apart from the inlet end. Thus, in this embodiment, Side B has an uncoated inlet band followed by a coated light-off band. Therefore, in this embodiment, there is an uncoated inlet band on both sides of the strip. There is a coated light-off band on Side B, and Side A is coated with catalyst everywhere except at the inlet band. This arrangement is equivalent to having a coated light-off band on both sides, plus a coated combustion area on Side A.

In another, more general, embodiment, both sides of the strip have an uncoated inlet band, and a coated light-off band. Side A also includes at least one coated combustion band, downstream of the light-off band. Side B is coated only in the light-off band. In this embodiment, Side A can have a plurality of coated combustion bands, separated by uncoated bands. Preferably, the final band of Side A is uncoated. All of the uncoated bands provide areas at which the strips can be welded together.

Thus, in all of the above-described alternatives, one or both sides of the strip are selectively coated with catalyst.

In another embodiment, the strip has a shoulder, located at the inlet end. The shoulder supports the catalytic combustor when it is mounted in a gas turbine.

In another embodiment, the catalytic combustor of the present invention is formed from a single strip that is folded back and forth upon itself. The strip is prepared such that, after folding, the desired configuration of coated and uncoated portions is achieved.

The feature that is common to all embodiments is that the strip is not coated at its inlet end. Thus, no combustion occurs at the inlet end, and the strip is not heated at this end. The tensile strength of the strip is not diminished, and the inlet end becomes a structural support for the remainder of the strip.

The present invention therefore has the primary object of providing a catalytic combustor for a gas turbine.

The invention has the further object of providing a catalytic combustor in which the temperature in the combustor is limited, so as to prevent deactivation of the catalyst.

The invention has the further object of providing a catalytic combustor which retains its structural rigidity.

The invention has the further object of providing a catalytic combustor in which the pressure drop through the combustor is reduced.

The invention has the further object of providing a catalytic combustor which comprises a selectively coated metal strip.

The invention has the further object of reducing NOx formation in a gas turbine.

The invention has the further object of providing a catalytic combustor for a gas turbine, the combustor being formed from a metal strip that is folded back and forth upon itself.

The invention has the further object of providing a method of making a catalytic combustor as described above.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1A:
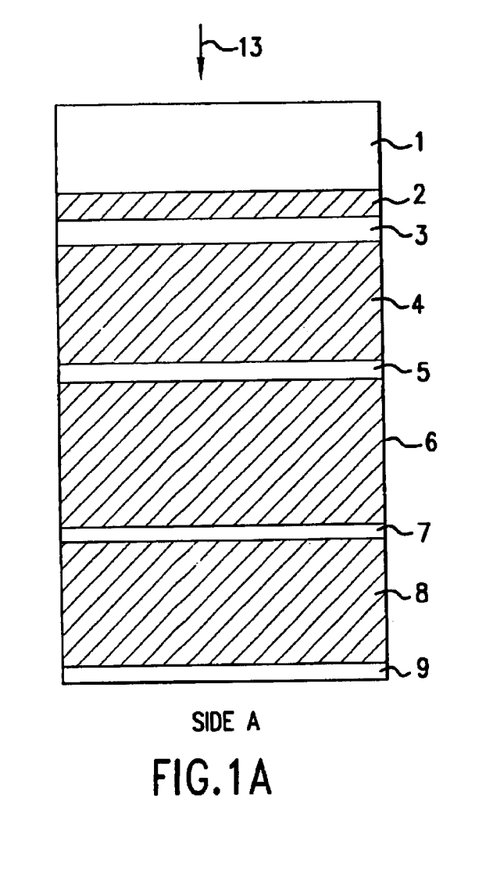
FIG. 1A provides a plan view of one side of a strip which is coated with catalyst, and used to form the catalytic combustor of the present invention.
Figure 1B:
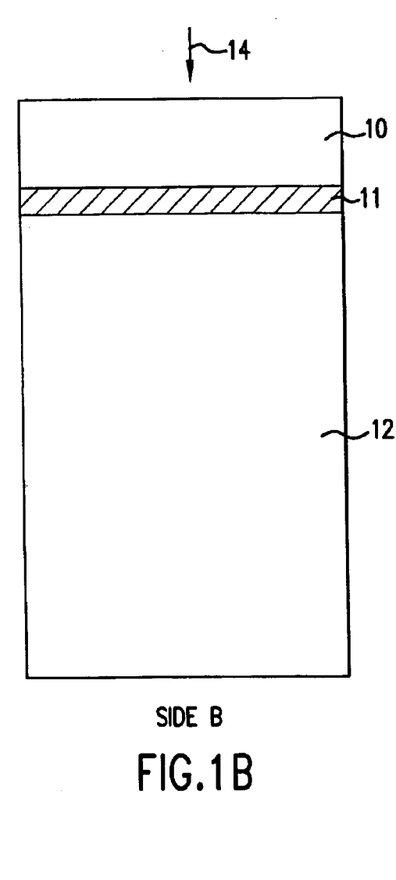
FIG. 1B provides a plan view of the other side of the strip of FIG. 1A.

The present invention comprises a catalytic combustor formed of a plurality of strips coated with catalyst as shown in FIGS. 1A and 1B. FIG. 1A is a plan view of a first side of the strip, designated as Side A. FIG. 1B is a plan view of the other side of the same strip, designated as Side B. The strip has various bands, labeled 1 through 12, the cross-hatched areas representing those bands having a catalyst coating, and the areas without cross-hatching representing those bands having no catalyst coating.

The arrangement of FIGS. 1A and 1B applies whether the strip is flat or corrugated. For convenience of illustration, no corrugations are shown.

Band 1 is a wide, uncoated band, and band 10 is located on the opposite side of the strip from band 1. Bands 1 and 10 are located at the inlet end of the strip. That is, they are positioned at the end at which combustion gas flows into the combustor. Arrows 13 and 14, pertaining to Sides A and B, respectively, indicate the direction of gas flow.

Because bands 1 and 10 are not coated, no combustion occurs on these bands. Consequently, the temperature of the band remains low. Thus, the band retains its tensile strength, and becomes a structural support for the remainder of the strip. The portion of the strip represented by bands 1 and 10 also serves as an area where adjacent strips can be welded together where they come into contact, since welding cannot be done through a catalyst coating.

Bands 2 and 11 are coated bands, also located exactly opposite each other on Side A and Side B, respectively, of the strip. These bands are bands of intermediate width. Since bands 2 and 11 are exactly "back to back", the portion of the strip represented by bands 2 and 11 is coated with catalyst on both sides. This double-sided coating is intended to lower the light-off temperature of the fuel-air mixture, as is explained in copending U.S. patent application Ser. No. 09/586,482, the disclosure of which is incorporated by reference herein.

Bands 4, 6, and 8 are coated with catalyst, so as to sustain catalytic combustion. These are the primary areas where catalytic combustion occurs, and they therefore occupy the majority of the area of Side A of the strip. The catalyst material used in bands 4, 6, and 8 may be the same or different from the catalyst used in band 2.

Bands 3, 5, 7, and 9 are relatively narrow bands, and are not coated with any catalyst.

All of bands 3, 5, 7, and 9 provide locations at which the strip can be welded to adjacent similar strips.

In another embodiment, band 11 can be uncoated. That is, Side B of the strip is completely uncoated, and the light-off band exists on Side A only, i.e. band 2. This embodiment is illustrated by FIG. 1C, which shows Side B of the strip without any catalyst coating.

The welding mentioned above can be accomplished in the following manner. A pair of strips are arranged such that the bands are aligned, and the strips are pressed together, while an electric current is applied through electrodes placed at the outer sides of the pair, at positions corresponding to a selected uncoated band. The current generates a spot weld, which joins the strips at a point on the uncoated band. The process can be repeated, if desired, for other spots on the same or other bands. Such pairs of strips are later stacked to form a complete combustor. The pairs can be welded together with the use of tweezers. One inserts a set of tweezers about 3 mm into adjacent cells of the structure, wherein the adjacent cells belong to different pairs of strips, and one then welds the pairs together resistively, thereby forming an integral combustor where all the strips are joined.

Both strips are uncoated at the outlet end, as represented by band 9 on Side A (FIG. 1A) and band 12 on Side B (FIG. 1B). Thus, no combustion occurs here, and no heat is generated here. This uncoated section intercepts radiation from the flame that exists downstream of the combustor, and prevents overheating of the combustor.

Figure 1C:
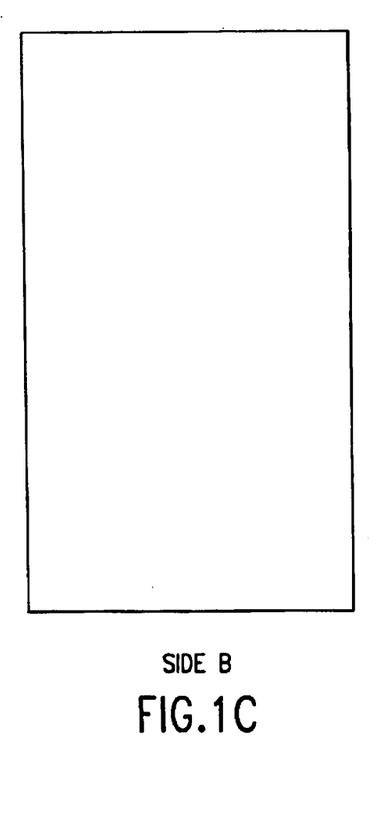
FIG. 1C provides a plan view of the side of the strip shown in FIG. 1B, in an alternative embodiment wherein this side of the strip is not coated with catalyst.

The combustor is assembled from strips such as that shown in FIGS. 1A–1C, such that a Side A of one strip faces Side A of an adjacent strip, and Side B of one strip faces Side B of an adjacent strip. That is, the sides which are largely coated with catalyst face each other, and the sides which are uncoated (except possibly for the light-off band) also face each other. This structure defines combustion cells (regions bounded by coated sides) and heat absorption cells (regions bounded by uncoated sides). Gas flowing through the heat absorption cells carries away some of the heat of combustion, and thereby prevents a destructive increase in temperature in the combustor.

The fact that band 12 is not coated also enables the band to be a site for spot welding, as described above, similar to the uncoated bands on Side A.

Table 1 provides a summary of the functions of each of the bands, and provides an example of the nominal axial width of the bands, in one preferred embodiment. In the example given, the total axial width of the strip, i.e. the total distance traversed by the gas flowing through the combustor, is 6.0 inches. While the widths shown in the table are preferred, the invention is not to be deemed limited by the values given in the table.

TABLE 1

|  | Nominal Width, inches | Uncoated to allow welding | Uncoated to limit inlet temp. | Coated to light off fuel | Uncoated to isolate light-off band | Coated to sustain combustion | Uncoated to limit combustor temp. |
|---|---|---|---|---|---|---|---|
| Side A Band 1 | 1.50 | Yes | Yes | | | | |
| Side A Band 2 | 0.50 | | | Yes | | | |
| Side A Band 3 | 0.25 | Yes | | | | Yes | |

TABLE 1-continued

| | Nominal Width, inches | Uncoated to allow welding | Uncoated to limit inlet temp. | Coated to light off fuel | Uncoated to isolate light-off band | Coated to sustain combustion | Uncoated to limit combustor temp. |
|---|---|---|---|---|---|---|---|
| Side A Band 4 | 1.00 | | | | | Yes | |
| Side A Band 5 | 0.25 | Yes | | | | | |
| Side A Band 6 | 1.00 | | | | | Yes | |
| Side A Band 7 | 0.25 | Yes | | | | | |
| Side A Band 8 | 1.00 | | | | | Yes | |
| Side A Band 9 | 0.25 | Yes | | | | | |
| Side B Band 10 | 1.50 | Yes | Yes | | | | |
| Side B Band 11 | 0.50 | | | Yes | | | |
| Side B Band 12 | 4.00 | Yes | | | | | Yes |

To construct a combustor, pairs of flat and corrugated strips are welded together, as described above, and sheared to the widths needed to fill the cross-section of the combustor. Some typical end views of combustors are shown in FIGS. 2 and 6A–6C.

Figure 3:
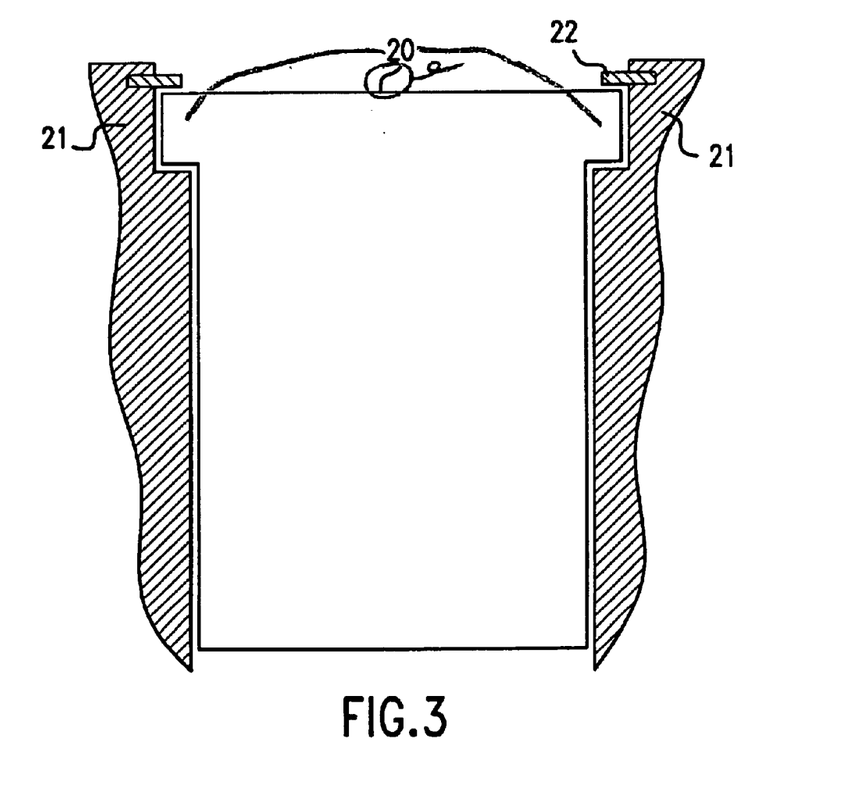
FIG. 3 provides a diagram showing a catalytic combustor of the present invention inserted within a gas turbine, the catalytic combustor having a shoulder which engages a structural member of the turbine.

In a preferred construction the strips are sheared to form shoulders 20 having the same width as the uncoated band 1, as shown in FIG. 3. The shoulder rests against body 21 of the turbine. The thrust from the pressure drop through the combustor is transferred to the body of the turbine.

When the turbine is operating normally, shoulder 20 is supporting the combustor against the thrust of the gas which is flowing downward in the view of FIG. 3. If the fuel is cut off suddenly, there will be a surge of back flow through the combustor, and the thrust on the combustor will be upward in FIG. 3. This thrust can be many times the thrust in normal operation. In FIG. 3, ring 22 is a retainer which is connected to the body of the turbine, and which absorbs the upward thrust of the shoulder. In one embodiment, as shown in FIG. 3, the ring is a snap ring. In an alternative embodiment, the ring can be bolted to the body of the turbine.

Figure 4A:
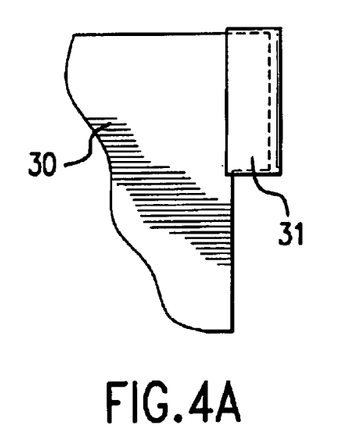
FIG. 4A provides a fragmentary plan view of a portion of the strip of the present invention, showing an alternate construction of the shoulder.
Figure 4B:
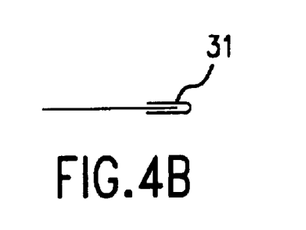
FIG. 4B provides an end view showing the relationship between the strip and a tab, in the detail shown in FIG. 4A.

A shoulder can also be formed by welding tabs to the strips, as shown in FIGS. 4A and 4B. FIG. 4A shows strip 30 with metal tab 31 welded thereto. Tab 31 is preferably a piece of metal that is thicker than the strip. The tab in FIGS. 4A and 4B overlaps and strengthens the shoulder previously formed in the strip. FIG. 4B provides an end view showing the relationship between the strip and the tab 31.

Figure 4C:
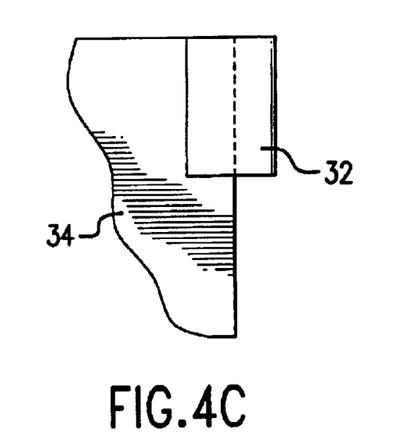
FIGS. 4C and 4D provide views similar to FIGS. 4A and 4B, respectively, showing another embodiment.
Figure 4D:
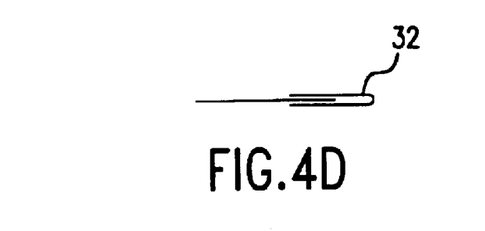

FIGS. 4C and 4D show an embodiment in which the strip 34 itself has no shoulder, and in which the tab 32 creates the shoulder.

Figure 5A:
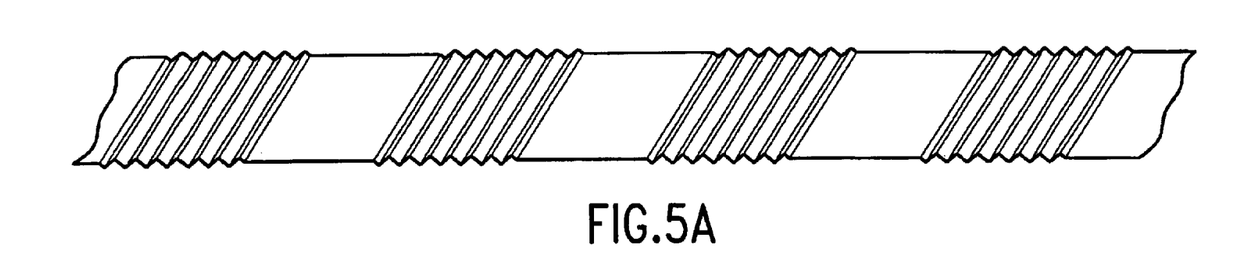
FIGS. 5A–5E show an alternating flat and corrugated strip that may be folded on itself to fill the annular cross-sections shown in FIGS. 6A–6C.
Figure 5B:
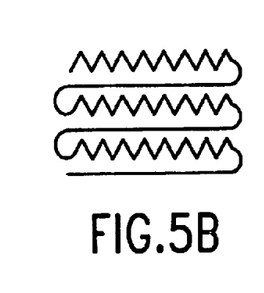
Figure 5C:
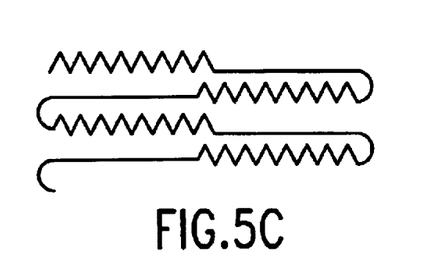
Figure 5D:
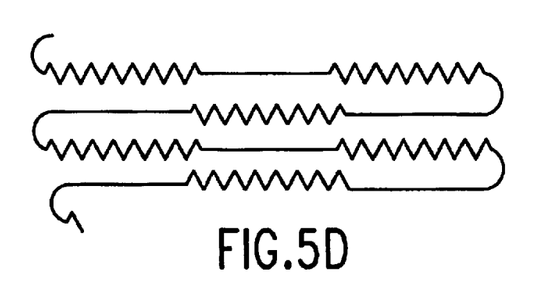

In another embodiment, the combustor of the invention is made of a single strip of metal that is folded back and forth upon itself. FIG. 5A shows a periodically corrugated strip that can be folded back and forth upon itself to make a structure having a desired cross-sectional shape. The strip is folded in the same general manner taught in U.S. Pat. Nos. 4,576,800 and 6,060,173, the disclosures of which are incorporated by reference herein. In one basic embodiment, one side of the strip comprises a repeating sequence of "A" sections, each having the same length along the strip, and the other side of the strip comprises a repeating sequence of "B" sections, in phase with the "A" sections and having the same length as the "A" sections. It is apparent that, when such a strip is folded back and forth upon itself as shown in FIG. 5B, the result is a generally rectangular structure in which the "A" sections face each other and the "B" sections face each other. Thus, this single-strip structure is essentially equivalent to the stack of separate strips described above.

By appropriate choice of the locations for each fold, i.e. by gradually varying the lengths of the "A" and "B" sections, one can make a folded structure which fills virtually any desired cross-sectional shape, including an annulus, using one continuous length of strip. A computer program can be readily devised for determining the lengths of these various sections so as to fill a desired cross-section. The strip shown in FIG. 5A has alternating flat and corrugated sections of approximately the same length, and these can be the "A" and "B" sections in the first single-strip embodiment described above.

When the strip is folded back on itself, the fold line is preferably located at the junction between flat and corrugated sections. Depending on the frequency of folding, stacks of various periodicities may be made, as shown in FIGS. 5B, 5C, 5D, and 5E.

Figure 5E:
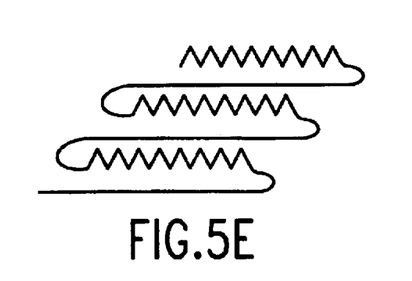

FIG. 5E shows an embodiment wherein the positions of the fold lines (of FIG. 5A) have been adjusted so that the folded stack "leans". This arrangement may be used with any of the stacks, to aid in the process of assembling them into an annulus.

Figure 2:
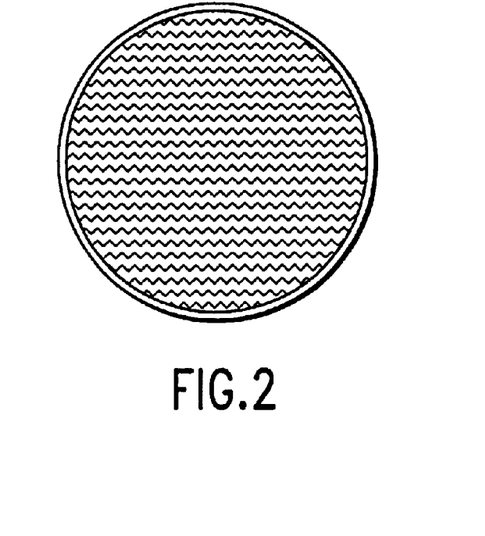
FIG. 2 provides an end view of one possible configuration of the catalytic combustor of the present invention.

The section shown in FIG. 2 can also be filled by individually cut strips, typically alternating flat and corrugated, or any form of alternating corrugated strips that will stack on themselves to form channels, such as the stacks of FIGS. 5B–5E.

Figure 6A:
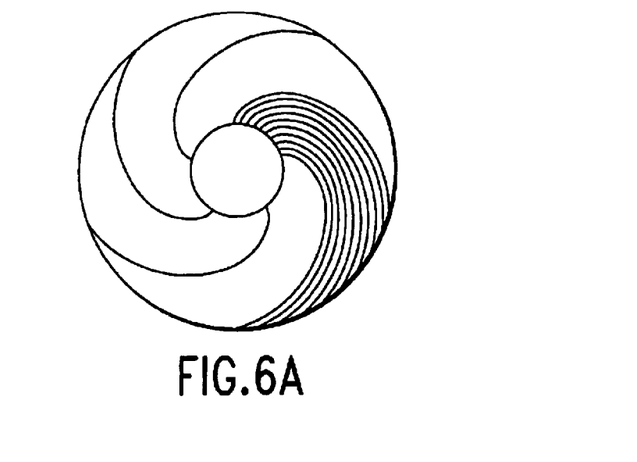
FIGS. 6A–6C show annular cross-sections filled by the strip shown in FIG. 5A.
Figure 6B:
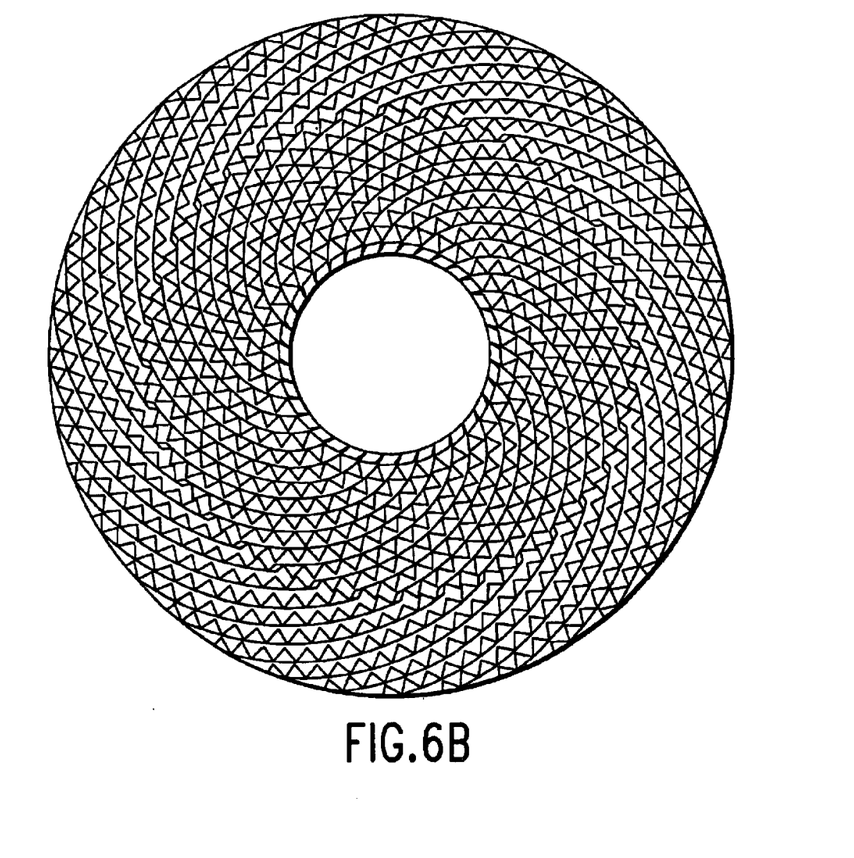
Figure 6C:
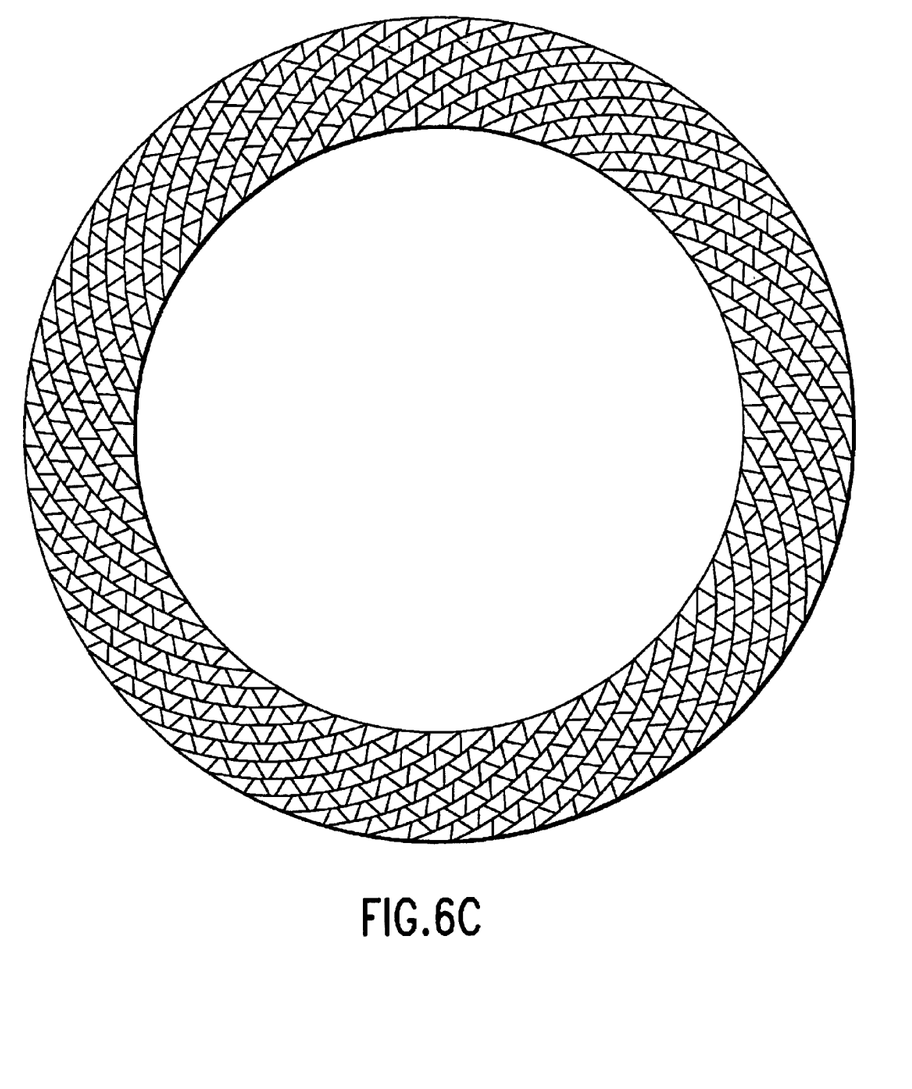

The annular combustors shown in FIGS. 6A–6C are defined by concentric metal cylinders that form the shell of the combustor. The annular space can be filled with individually cut strips. The shortest strip that can be used has the length $L=D_1(D_2^2/D_1^2-1)/2$, where $D_1$ is the inside diameter and $D_2$ is the outside diameter of the annulus to be filled. When this shortest length is used, the strips will have the curve of an involute with base diameter $D_1$. If shorter strips were used, there would be gaps between the strips and the annulus which would not be filled. When longer strips are used, there will be fewer longer strips and the curve will not be an involute. The minimum number of strips is just two.

In each of the embodiments shown above, the channels defined by the strips are straight, like a bundle of drinking straws. That is, the paths through which combustion gas flows are straight. This arrangement gives the lowest pressure drop.

In its most general form, the catalytic combustor of the present invention includes one or more strips which are selectively coated with catalyst, to achieve the objectives described above. Selective coating means that a portion of the strip contains a catalyst coating on some but not all of that portion of the strip.

The invention can be modified in various ways. The configuration of the strip, shown in FIGS. 1A and 1B, represents the most general case, but can be modified. For example, any or all of bands 3, 5, 7, and 9 could be omitted. If all of these bands were omitted, Side A would be entirely coated with catalyst except in band 1. Of course, no welding can be done through a coated area.

The number of uncoated bands could also be varied. It is possible to construct a combustor from a strip having more or fewer uncoated bands. Also, the axial lengths of the coated and uncoated bands can be changed. In general, it is desirable that the coated areas of Side A occupy the majority of that side, but the relative size of the uncoated bands can be varied to suit particular needs. Also, the size of the light-off band (bands 2 and 11) can be varied somewhat, within the scope of the invention.

The strip shown in FIGS. 1A–1C can be used to construct combustors having shapes and forms other than those specifically illustrated.

Such modifications will be apparent to the reader skilled in the art, and should be deemed within the spirit and scope of the following claims.

What is claimed is:

1. A catalytic combustor comprising a plurality of similar strips of metal, each strip having two sides, designated as Side A and Side B, each strip having an inlet end and an outlet end, the strips being arranged to form a stack, wherein Side A of each strip inside the stack faces Side A of an adjacent strip, and wherein Side B of each strip inside the stack faces Side B of an adjacent strip, wherein Side A of each strip has an uncoated inlet band located at the inlet end, Side A being coated with catalyst elsewhere, and wherein Side B is uncoated.

2. The combustor of claim 1, wherein each strip has a shoulder located at the inlet end.

3. A catalytic combustor comprising a plurality of similar strips of metal, each strip having two sides designated as Side A and Side B, each strip having an inlet end and an outlet end, the strips being arranged to form a stack, wherein Side A of each strip inside the stack faces Side A of an adjacent strip, and wherein Side B of each strip inside the stack faces Side B of an adjacent strip, wherein Side A of each strip has an uncoated inlet band located at the inlet end, Side A being coated with catalyst elsewhere, wherein Side B has an uncoated inlet band located at the inlet end, wherein Side B also has a light-off band which is coated with catalyst, the light-off band being adjacent to the inlet band, and wherein Side B is uncoated elsewhere.

4. The combustor of claim 3, wherein the inlet band of Side A is opposite to, and has a same size as, the inlet band of Side B.

5. The combustor of claim 3, wherein the strip has a shoulder located at the inlet end.

6. A catalytic combustor comprising a plurality of similar strips of metal, each strip having two sides designated as Side A and Side B, each strip having an inlet end and an outlet end, the strips being arranged to form a stack, wherein Side A of each strip inside the stack faces Side A of an adjacent strip, and wherein Side B of each strip inside the stack faces Side B of an adjacent strip, wherein Side A of each strip has an uncoated inlet band located at the inlet end, wherein Side B of each strip has an uncoated inlet band located at the inlet end, wherein Side A has a light-off band which is coated with catalyst, adjacent to the inlet band, wherein Side A has at least one combustion band, downstream of the light-off band, the combustion band being coated with catalyst, wherein Side B has a light-off band which is coated with catalyst, adjacent to the inlet band, and wherein Side B is uncoated elsewhere.

7. The combustor of claim 6, wherein the inlet band of Side A is opposite to, and has a same size as, the inlet band of Side B.

8. The combustor of claim 7, wherein the light-off band of Side A is opposite to, and has a same size as, the light-off band of Side B.

9. The combustor of claim 6, wherein an uncoated band separates the light-off band of Side A from said combustion band.

10. The combustor of claim 6, wherein Side A has a plurality of combustion bands, the combustion bands being separated by uncoated bands.

11. The combustor of claim 10, wherein Side A has a final band, located at the outlet end, the final band being uncoated.

12. The combustor of claim 6, wherein the strip has a shoulder located at the inlet end.

13. The combustor of claim 6, wherein the inlet band is wider than the light-off band.

14. The combustor of claim 13, wherein at least one combustion band is wider than the light-off band.

15. The combustor of claim 6, wherein at least one combustion band is wider than the inlet band.

16. A catalytic combustor comprising a strip of metal folded back and forth upon itself, the strip having two sides, designated as Side A and Side B, wherein Side A includes a plurality of regions which are selectively coated with catalyst according to a pattern designated as pattern "A", and wherein Side B is uncoated, and wherein, when the strip is folded back and forth upon itself, each pattern "A" faces another pattern "A".

17. A catalytic combustor comprising a strip of metal folded back and forth upon itself, the strip having two sides, designated as Side A and Side B, wherein Side A includes a plurality of regions which are selectively coated with catalyst according to a pattern designated as pattern "A", and wherein Side B is uncoated, wherein, when the strip is folded back and forth upon itself, each pattern "A" faces another pattern "A", wherein the strip has an inlet end, wherein pattern "A" defines an uncoated inlet band located at the inlet end of the strip, and a coated region outside said uncoated inlet band.

18. A method of making a catalytic combustor, comprising:

a) providing a plurality of similar strips of metal, each strip having two sides, designated as Side A and Side B, each strip defining an inlet end, b) selectively coating Side A of each strip with catalyst, such that Side A of each strip has an uncoated band located at the inlet end, and a catalyst coating elsewhere, and wherein Side B of each strip is uncoated, and c) arranging the strips to form a stack, such that Side A of each strip inside the stack faces Side A of an adjacent strip, and such that Side B of each strip inside the stack faces Side B of an adjacent strip.

19. A method of making a catalytic combustor, comprising:

a) providing a plurality of similar strips of metal, each strip having two sides, designated as Side A and Side B, each strip defining an inlet end, b) selectively coating Side A of each strip with catalyst, such that Side A of each strip has an uncoated band located at the inlet end, and a catalyst coating elsewhere, and coating Side B of each strip such that Side B has an uncoated band located at the inlet end and a light-off band adjacent to said uncoated band, and c) arranging the strips to form a stack, such that Side A of each strip inside the stack faces Side A of an adjacent strip, and such that Side B of each strip inside the stack faces Side B of an adjacent strip.

* * * * *